Figure 1:
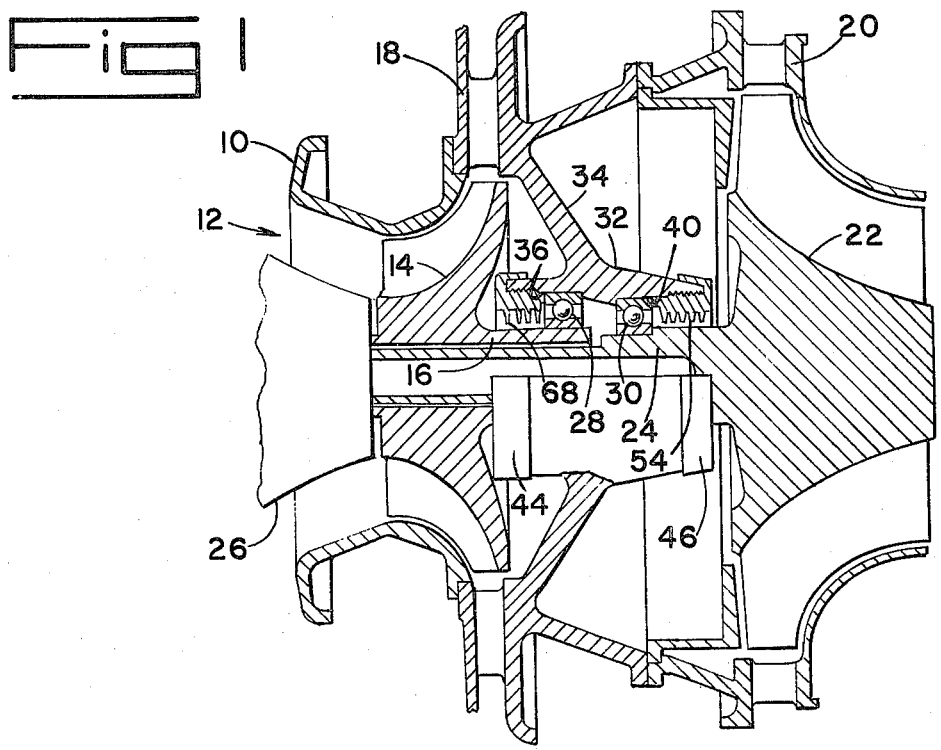

United States Patent [19]

Shank

[11] 3,915,523

[45] Oct. 28, 1975

[54] LOCKING THREADED ELEMENT
[75] Inventor: Wayne C. Shank, Tucson, Ariz.
[73] Assignee: Avco Corporation, Williamsport, Pa.
[22] Filed: Oct. 1, 1973
[21] Appl. No.: 401,970

[52] U.S. Cl............. 308/236; 29/148.4 T; 403/320; 417/405
[51] Int. Cl.[2] .......................................... F16D 13/60
[58] Field of Search........ 417/405, 406; 29/148.4 T; 403/320; 308/236

[56] References Cited
UNITED STATES PATENTS

| 2,729,479 | 1/1956 | Leister | 308/236 |
|---|---|---|---|
| 3,171,776 | 3/1965 | Hart et al. | 308/236 |
| 3,428,377 | 2/1969 | Christian et al. | 308/236 |
| 3,741,361 | 6/1973 | Brandenstein | 308/236 |
| 3,771,845 | 11/1973 | Stricklen | 308/236 |

Primary Examiner—M. Henson Wood, Jr.
Assistant Examiner—Richard A. Bertsch
Attorney, Agent, or Firm—Charles M. Hogan; Irwin P. Garfinkle; Gary M. Gron

[57] ABSTRACT

A retaining collar comprising an inner sleeve having external threads and threaded into an annular recess of a housing to hold a bearing assembly in place. The retaining collar has an integral flange and a concentric outer sleeve which is deformed into a notch on the periphery of the housing to lock the collar in place.

5 Claims, 2 Drawing Figures

LOCKING THREADED ELEMENT

The present invention relates to threaded elements and more particularly those of the locking type.

Threaded elements used to fasten and secure components of a gas turbine engine are required to have a positive locking system preventing them from becoming disengaged during operation. A multitude of ways have been proposed to accomplish this end. The most frequent approach seen is one in which mating holes are provided through the elements threaded together and wire passed through the holes to prevent rotation. Other systems have been proposed for locking two threaded elements, such as that proposed in the patent to Joberty, U.S. Pat. No. 410,812. In this patent a nut is locked in place over a bolt by an extension of the nut which can be deformed into notches in the bolt. While this provides an effective lock, it is limited in application to those situations having no axial space limitations. In a gas turbine engine, however, there are many instances in which there is limited axial clearance between the screw or bolt and the adjacent rotating or stationary parts.

The above problem is solved in accordance with the present invention by apparatus which comprises an annular housing having an inner annular recess receiving a component to be secured. A locking element comprising an inner annular element is threaded into the recess to hold the component in place. The locking element further comprises a flange and an outer deformable sleeve extending over a portion of the housing. The housing has at least one notch so that the outer sleeve can be deformed into the notch and lock the element in place.

The above and other related features of the present invention will be apparent from a reading of the following description of the disclosure pointed out in the appended drawings and the novelty thereof pointed out in the appended claims.

Figure 2:
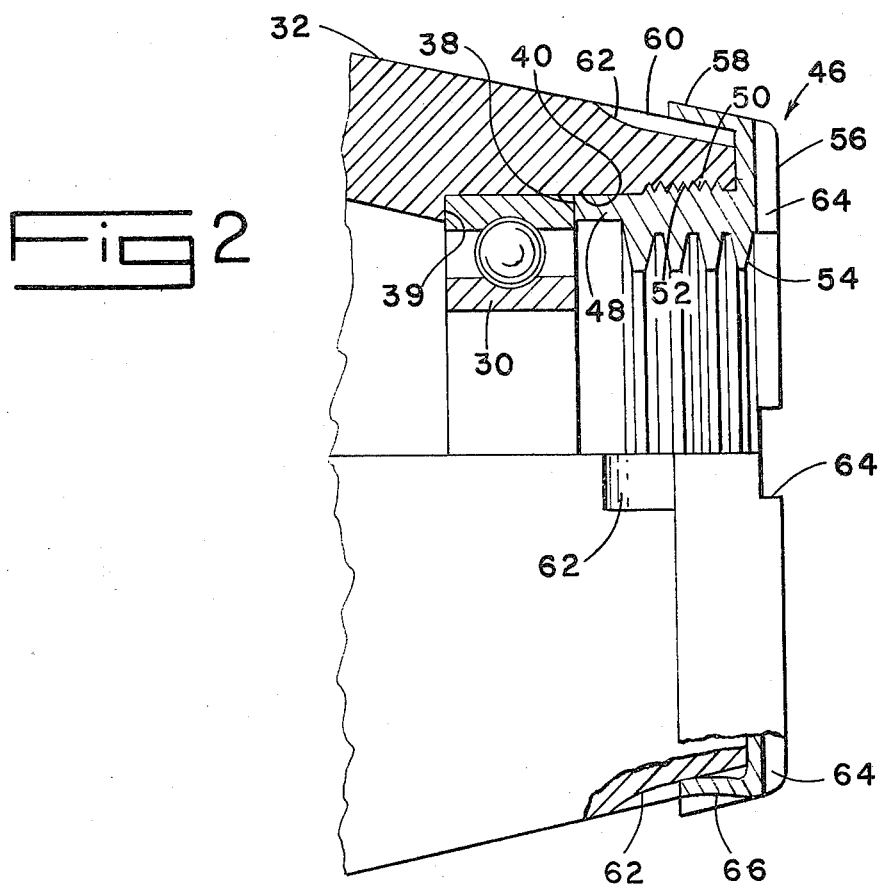

In the drawing:

FIG. 1 is a longitudinal section view of a portion of a gas turbine engine showing a locking threaded element which embodies the present invention; and FIG. 2 is a greatly enlarged fragmentary view of the locking element of FIG. 1.

Referring to FIG. 1 there is shown a portion of a gas turbine engine with which the present invention may be used. In order to simplify the description of the invention many of the components have been eliminated. However, it should be apparent to those skilled in the art that the usual components necessary to make a complete and operable gas turbine engine may be added to the elements of FIG. 1. The gas turbine engine has an annular bellmouth housing 10 forming an inlet 12 for air which passes across a bladed centrifugal impeller 14 mounted on a tubular shaft 16. Air from the bladed impeller passes through a diffuser 18 for further increase in its static pressure level and is discharged into a pressure chamber in which a combustor is positioned. Metered fuel is injected into the combustor and mixed with compressed air. The resultant fuel/air mixture is ignited to generate a hot gas stream which is discharged via a turbine inlet duct (not shown) and across a turbine inlet nozzle 20 and integral turbine shroud which are structurally connected to the diffuser 18. From there the hot gas stream passes across a bladed centripetal turbine wheel 22 for discharge to the atmosphere. Turbine wheel 22 is supported on a tubular shaft 24 which extends forward to a gear box 26 that may be of the differential type, as described in copending application Ser. No. 236,031, entitled "Easily Maintainable Gas Turbine Engine", in the name of Val Cronstedt and of common assignment with the present invention. Shafts 16 and 24 are respectively journaled by bearings 28 and 30. These bearings are supported by an annular bearing housing 32 connected to the diffuser structure through a conical extension 34. Housing 32 has a forward facing recess 36 which receives bearing assembly 28. Housing 32 has an aft facing recess 40 which receives bearing assembly 30.

In this engine it is essential to hold the bearings securely in place without the possibility of any connection coming loose through vibration or other means. In accordance with the present invention the locking elements in the form of collars 44 and 46 are respectively provided to hold the bearings 28 and 30 in place. These locking screws are substantially identical. Therefore, only the aft locking collar 46 will be described, as illustrated in FIG. 2.

The locking collar 46 comprises an inner sleeve 48 having external threads 50 engaging internal threads 52 on the interior of recess 40. The inner face 38 of sleeve 48 abuts bearing assembly 30 and holds it against shoulder 39 in recess 40.

Inner sleeve 48 preferably has integral labyrinth teeth 54 to additionally act as a seal across shaft 24 (not shown in this view). Sleeve 48 has a flange 56 and a substantially concentric outer sleeve 58 which extends back over a portion of the outer periphery 60 of housing 32. Outer sleeve 58 is made from deformable material. In the preferred form in which the inner sleeve 58, flange 56 and outer sleeve 58 are integral, the outer sleeve 58 is substantially thinner than the inner sleeve 48 to permit it to be deformed. The periphery 60 of housing 32 has one or more notches 62 in line with the outer sleeve 58. Flange 56 has a series of radial notches 64 to permit the locking collar 46 to be wrenched into and out of the recess 40.

The locking collar 46 is loosely placed over shaft 24 and then the bearing is telescoped over shaft 24. Once this is done, the bearing assembly is locked into position on the shaft 24 by a suitable arrangement, such as a locking collar, and the assembly inserted into the housing 32. When the threaded portion 52 of recess 40 is reached the locking collar 46 is rotated by engaging notches 64 with a tool extending radially outward to thereby tighten bearing assembly 30 against shoulder 42.

When the locking collar 46 is tightened sufficiently it is locked in place simply by deforming the outer sleeve 58 in line with a notch 62 to prevent rotation, as illustrated at 66 in FIG. 2. It is to be noted that the locking arrangement is made operative by access from a point directly radially outward from the locking collar itself and requires no additional axial access space. This is particularly important when the locking collar is used in connection with a centrifugal compressor or a centripetal turbine. The axial space between the locking collar and the wheel or hub itself is extremely limited and makes it very difficult to properly lock a threaded element in place. The present locking collar, however, substantially simplifies this operation. When the bearing is to be removed the outer sleeve is simply deformed to clear the notches and the collar unthreaded from the housing 32. The assembly of the locking collar 44 for the compressor shaft bearing 28 generally is similar to that for collar 46.

An additional advantage of this locking collar is that it has an integral labyrinth seal formed by teeth 54 which form the dual function in the present application of defining a bearing sump chamber for bearings 28 and 30 between the seal 54 and a forward seal 68 integral with collar 44.

While the preferred embodiment of the present invention has been described, it should be apparent to those skilled in the art that it may be employed in other forms without departing from its spirit and scope.

Having thus described the invention, what is claimed as novel and desired to be secured by Letters Patent of the United States is:

1. Apparatus comprising:
   an annular housing having an inner cylindrical axial recess therein, said recess extending from an internal annular shoulder to an open end thereof, said housing having internal threads at said open end;
   an annular bearing assembly for a shaft received in said recess, said bearing assembly having one end face abutting said shoulder;
   a locking threaded element for axially securing said bearing assembly against said shoulder, said element comprising an inner cylindrical sleeve having external threads threaded into said internal threads, an end of said sleeve abutting the other face of said bearing assembly, the other end of said sleeve having a flange and an outer deformable sleeve received over a portion of the outside periphery of said housing at said open end;
   said housing having at least one notch on its periphery at said open end, said periphery being surrounded at said open end by said outer sleeve whereby said outer sleeve is deformable into the notch to prevent rotation of said inner sleeve.

2. Apparatus as in claim 1 wherein said inner sleeve, flange and outer sleeve are integral, said outer sleeve being substantially thinner than said inner sleeve thereby permitting it to be deformed into said notch.

3. Apparatus as defined in claim 1 wherein
   said cylindrical axial recess in said annular housing extends from said open end to the opposite end, said opposite end also being open, said housing having second internal threads at said opposite end, and a second annular shoulder spaced from said opposite end; and
   a second annular bearing assembly for a second shaft received in said recess, said second bearing assembly having one end face abutting said second shoulder;
   a second locking threaded element for axially securing said bearing assembly against said second shoulder, said second locking element comprising a second inner cylindrical sleeve having external threads threaded into said second internal threads, an end of said second inner sleeve abutting the other face of said second bearing assembly, the other end of said second inner sleeve having a flange and a deformable second outer sleeve received over a portion of the outside periphery of said housing at said opposite end, said housing having at least one notch on its periphery at said opposite end, said periphery being surrounded at said opposite end by said second outer sleeve whereby said second outer sleeve is deformable into said notch to prevent rotation of said second inner sleeve.

4. Apparatus as in claim 3 wherein said first and second bearing assemblies are closely adjacent one another and wherein the inner sleeves of said first and second locking elements further comprise means forming seals on their inner periphery for sealing said shafts, whereby a bearing sump chamber is formed which encompasses said first and second bearing assemblies.

5. Apparatus as in claim 4 wherein the inner and outer sleeves and flanges are integral for both of said locking elements.

* * * * *